(12) United States Patent
Pantaleoni (10) Patent No.: US 8,102,394 B2
(45) Date of Patent: Jan. 24, 2012

(54) COMPUTER GRAPHICS USING MESHLESS FINITE ELEMENTS FOR LIGHT TRANSPORT

(75) Inventor: Jacopo Pantaleoni, Berlin (DE)

(73) Assignee: Mental Images GmbH, Berlin (DE)

( * ) Notice: Subject to any disclaimer, the term of this patent is extended or adjusted under 35 U.S.C. 154(b) by 1069 days.

(21) Appl. No.: 11/956,264

(22) Filed: Dec. 13, 2007

(65) Prior Publication Data

US 2008/0150938 A1 Jun. 26, 2008

Related U.S. Application Data

(60) Provisional application No. 60/870,044, filed on Dec. 14, 2006.

(51) Int. Cl.
*G06T 15/50* (2011.01)
*G06T 15/60* (2006.01)
*G06T 15/00* (2011.01)
*G06T 15/40* (2011.01)

(52) U.S. Cl. ......... 345/426; 345/419; 345/420; 345/421

(58) Field of Classification Search .................. None
See application file for complete search history.

(56) References Cited

U.S. PATENT DOCUMENTS

| | | | |
|---|---|---|---|
| 4,973,111 | A | 11/1990 | Haacke |
| 6,028,606 | A | 2/2000 | Kolb |
| 6,529,193 | B1 | 3/2003 | Herken |
| 6,529,197 | B1 | 3/2003 | Ballard et al. |
| 6,911,976 | B2 | 6/2005 | Abramov |
| 7,006,110 | B2 | 2/2006 | Crisu |
| 7,085,435 | B2 | 8/2006 | Takiguchi |
| 2002/0126129 | A1 | 9/2002 | Snyder |
| 2003/0063082 | A1 | 4/2003 | Abramov |

(Continued)

FOREIGN PATENT DOCUMENTS

| WO | 02 03326 | 1/2002 |
|---|---|---|
| WO | 03 098467 | 11/2003 |

OTHER PUBLICATIONS

Frederic Perez et al, Acceleration of Monte Carlo Path Tracing in General Environments, Proceedings of the 8th Pacific Conference on Computer Graphics and Applications, Oct. 3-Oct. 5, 2000, Hong Kong, China, pp. 71-77, http://www.computer.org/portal/web/csdl/abs/proceedings/pg/2000/0868/00/08680071abs.htm.*

(Continued)

*Primary Examiner* — Kee M Tung
*Assistant Examiner* — Tize Ma
(74) *Attorney, Agent, or Firm* — Jacobs & Kim LLP; David Jacobs (57) ABSTRACT

Computer graphics methods, systems, apparatus and computer program code (software) products comprise: constructing a sparse implicit scene representation, wherein the representation is independent of geometric encoding and complexity of the input scene description, and the density of the resulting finite elements is proportional to their contribution to the final image to be generated, such that the geometric resolution of a given area of the obtained scene representation is proportional to its importance relative to the final image, wherein the constructing comprises using a Monte Carlo or quasi-Monte Carlo path tracing method to sample an adjoint importance distribution function and to shoot importons from a simulated camera into the scene, recording, for each simulated bounce, a particle i defined by selected information, the selected information comprising: 3D position $p_i$, surface normal $n_i$, and reflectance factor $p_i$.

19 Claims, 7 Drawing Sheets

U.S. PATENT DOCUMENTS

| | | |
|---|---|---|
| 2004/0125103 A1 | 7/2004 | Kaufman |
| 2005/0264564 A1 | 12/2005 | Keller |
| 2005/0264565 A1 | 12/2005 | Keller |
| 2005/0264568 A1 | 12/2005 | Keller |
| 2005/0275652 A1 | 12/2005 | Keller |
| 2005/0275660 A1 | 12/2005 | Keller |
| 2005/0275663 A1 | 12/2005 | Kokojima |
| 2005/0278406 A1 | 12/2005 | Keller |
| 2006/0005193 A1 | 1/2006 | Illowsky |
| 2006/0062487 A1 | 3/2006 | Ouchi |
| 2006/0188175 A1 | 8/2006 | Takiguchi |
| 2007/0046686 A1 | 3/2007 | Keller |
| 2007/0109320 A1 | 5/2007 | Skibak |
| 2007/0127101 A1 | 6/2007 | Oldroyd |
| 2007/0271322 A1 | 11/2007 | Keller |

OTHER PUBLICATIONS

Jensen et al, Monte Carlo Ray Tracing, Siggraph 2003 Course 44, Jul. 29, 2003, University of California, San Diego, http://www.cs.rutgers.edu/~decarlo/readings/mcrt-sg03c.pdf.*

Lemieux, "Using Lattice Rules for Variance Reduction", Dept. of Mathematics, U. of Calgary, 2000.

Morokoff, "Quasi-Monte Carlo Integration", J. of Computational Physics, Dec. 1995.

Veach, "Optimally Combining Sampling Techniques for Monte Carlo Rendering", Computer Graphics Proceedings, 1995.

Shirley et al., "Monte Carlo Techniques for Direct Lighting Calculations", ACM Transactions on Graphics, 1996.

* cited by examiner

100

REPRESENTATION CONSTRUCTION MODULE, 10
(PATH TRACING, SHOOTING IMPORTONS, RECORDING INFORMATION)

CELL SAMPLING, AREA, FORM FACTOR ESTIMATING MODULE, 20

PROCESSING OF HIERARCHICAL GATHERING SUMS,
HIERARCHICAL STOCHASTIC SAMPLING, SAMPLE WARPING, 30

(RE-SAMPLED) IMPORTANCE-BASED STRATIFICATION, 40

PROCESSING OF UPPER BOUND ESTIMATES, 50

HIERARCHICAL STOCHASTIC RADIOSITY SOLVERS, 60

FINAL GATHERING, 70

PHOTON MAPPING, 80

FIG. 1

```
void warp(                                                              200
    const Node* root,           // tree root
    float x,                    // input [0,1) sample
    int i,                      // input cell index
    int& j,                     // output cell index
    float& p)                   // output cell probability
{
    // Initialize probability
    p = 1.0f;

const Node* node = root;
    while (node->is_leaf() == false)
    {
        // Compute left and right node bounds relative to i
        const Node* nodeL = node->left();
        const Node* nodeR = node->right();

float boundL = compute_bound( nodeL, i );
        float boundR = compute_bound( nodeR, i );

// Normalize left bound
        boundL /= boundL + boundR;

// Check whether the sample x falls left or right
        if (x <= boundL)
        {
            // Normalize x and update p
            x /= boundL;
            p *= boundL;
            node = nodeL;
        }
        else
        {
            // Normalize x and update p
            x = (x - boundL) / (1.0f - boundL);
            p *= (1.0f - boundL);
            node = nodeR;
        }
    }
    // Set output cell index
    j = node->leaf_index();
}
```

FIG. 2

```
typedef pair<float, const Node*> Priority_node;
typedef priority_queue< Priority_node > Priority_queue;

void stratify(
    const Node* root,              // tree root
    int i,                         // input cell index
    int S,                         // number of samples
    vector<const Node*>& strata)   // output strata
{
    Priority_queue queue;

queue.push( make_pair( 0.0f, root ) );

while (queue->empty() == false)
    {
        Priority_node queue_node = queue.top();
        queue.pop();

const Node* node = queue_node.second;

if (node->is_leaf())
            strata.push_back( node );
        else
        {
            // Compute left and right node bounds relative to i
            const Node* nodeL = node->left();
            const Node* nodeR = node->right();

float boundL = compute_bound( nodeL, i );
            float boundR = compute_bound( nodeR, i );

queue.push_back( boundL, nodeL );
            queue.push_back( boundR, nodeR );
        } if (strata.size() + queue.size() >= S)
            break;
    } while (queue->empty() == false)
    {
        Priority_node queue_node = queue.top();
        queue.pop();

strata.push_back( queue_node.second );
    }
}
```

COMPUTER GRAPHICS USING MESHLESS FINITE ELEMENTS FOR LIGHT TRANSPORT

CROSS-REFERENCE TO RELATED APPLICATIONS

This application for patent claims the priority benefit of U.S. Provisional Patent Application Ser. No. 60/870,044, filed on Dec. 14, 2006.

INCORPORATION BY REFERENCE

This application for patent incorporates by reference the following:

U.S. patent application Ser. No. 11/465,717 and PCT patent application Ser. No. PCT/US2006/0032393, both filed Aug. 18, 2006, and entitled "Image Synthesis Methods and Systems."

U.S. patent application Ser. No. 11/474,091 and PCT patent application Ser. No. PCT/US2006/0024820, both filed Jun. 23, 2006, and entitled "Image Synthesis by Rank-1 Lattices."

U.S. patent application Ser. No. 10/299,958, filed Nov. 19, 2002, entitled "System and Computer-Implemented Method for Evaluating Integrals Using a Quasi-Monte Carlo Methodology in Which Sample Points Represent Dependent Samples Generated Using a Low-Discrepancy Sequence."

U.S. patent application Ser. No. 10/439,311, filed May 15, 2003, entitled "System and Computer-Implemented Method for Evaluating Integrals Using Stratification by Rank-1 Lattices."

U.S. patent application Ser. No. 08/880,418, filed Jun. 23, 1997, now U.S. Pat. No. 6,529,193, entitled "System and Method for Generating Pixel Values for Pixels in an Image Using Strictly Deterministic Methodologies for Generating Sample Points."

FIELD OF THE INVENTION

The present invention relates generally to methods and systems for image synthesis in and by digital computing systems, such as for motion pictures and other computer graphics applications, and in particular, relates to methods, systems, devices, and computer program products adapted to enable finite element light transport simulation in computer graphics systems.

BACKGROUND OF THE INVENTION

The use of synthetic images has become increasingly important and widespread in motion pictures and other commercial and scientific applications. A synthetic image represents a two-dimensional array of digital values, called picture elements or pixels, and thus can be regarded as a two-dimensional function. Image synthesis, then, is the process of creating synthetic images from scenes. Image synthesis conventionally requires solving equations requiring substantial, and in some cases even impractical, levels of computational resources.

Accordingly, it would be desirable to provide improved methods, systems, devices and computer program products adapted for image synthesis.

More particularly, as described in greater detail below, it would be desirable to provide such methods, systems, devices and computer program products adapted to enable finite element light transport simulation, as well as new and improved radiosity and global illumination methods based on such an approach.

SUMMARY OF THE INVENTION

The invention provides systems, apparatus, computer software code products and methods for enabling computer graphics systems to accurately and efficiently render images.

Systems, apparatuses, computer program products and methods in accordance with the invention are suitable for implementation or execution in a computer graphics system for rendering images for storage or for display on a display element, the computer graphics system comprising a computer, the displaying comprising the display of images on the display element, and wherein the rendering of an image comprises utilizing the computer and/or other elements of the computer graphics system to generate pixel values corresponding to pixels in an image representation.

Systems, apparatuses, computer program products or methods in accordance with the present invention are suitable for implementation or execution in, or in conjunction with, a wide range of commercially available computer graphics systems, including (but not limited to), for example, computer graphics products and systems commercially available from MENTAL IMAGES GmbH of Berlin, Germany. (See, for example, the MENTAL RAY product from MENTAL IMAGES GmbH.) The to invention is also suitable for implementation or execution in, or in conjunction with, a wide range of other commercially available computer graphics systems, products, environments, hardware and software that provide rendering functionality. Given the description herein, and the attached drawing figures, one of ordinary skill in the relevant art will understand how the present invention may be so implemented or executed in, or in conjunction with, such commercially available computer graphics systems, products, apparatus or methods.

One aspect of the present invention comprises: (1) constructing a sparse implicit scene representation, wherein the representation is independent of geometric encoding and complexity of the input scene description, and the density of the resulting finite elements is proportional to their contribution to the final image, such that the geometric resolution of a given area of the obtained scene representation is proportional to its importance relative to the final image, (2) wherein the constructing comprises using a Monte Carlo or quasi-Monte Carlo path tracing method to sample an adjoint importance distribution function and to shoot importons from a simulated camera into the scene, recording, for each simulated bounce, a particle i defined by selected information, (3) the selected information comprising: 3D position $p_i$, surface normal $n_i$, and reflectance factor $p_i$.

Another aspect of the invention comprises utilizing the above-noted aspects in combination with the application of any of cell sampling, area and form factor estimates.

Another aspect of the invention comprises further utilizing hierarchical gathering sums.

Yet another aspect of the invention comprises also utilizing hierarchical stochastic sampling.

A further aspect of the invention comprises also utilizing sample warping.

Still another aspect of the invention comprises utilizing importance sampling and evaluating resulting sums utilizing a Monte Carlo or quasi-Monte Carlo quadrature formula.

Another aspect of the invention comprises the utilization of importance-based stratification: and this can comprise utilizing re-sampled importance-based stratification.

A further aspect of the invention comprises computing upper bound estimates: and this aspect can comprise utilizing Monte Carlo or quasi-Monte Carlo sampling.

Additional aspects of the invention, discussed in greater detail below, comprise utilizing hierarchical stochastic radiosity solvers, performing a final gathering operation, and utilizing photon mapping.

These and other aspects will be discussed in greater detail below in the following Detailed Description of the Invention and in connection with the attached drawing figures.

These and other aspects will be discussed in greater detail below in the following Detailed Description of the Invention and in connection with the attached drawing figures.

DETAILED DESCRIPTION OF THE INVENTION

The invention will next be described in detail in the following pages, taken in connection with the attached drawing figures. Those skilled in the art will appreciate that various additions, subtractions, and other modifications and implementations of the invention can be practiced, and are within the spirit and scope of the present invention.

Figure 1:
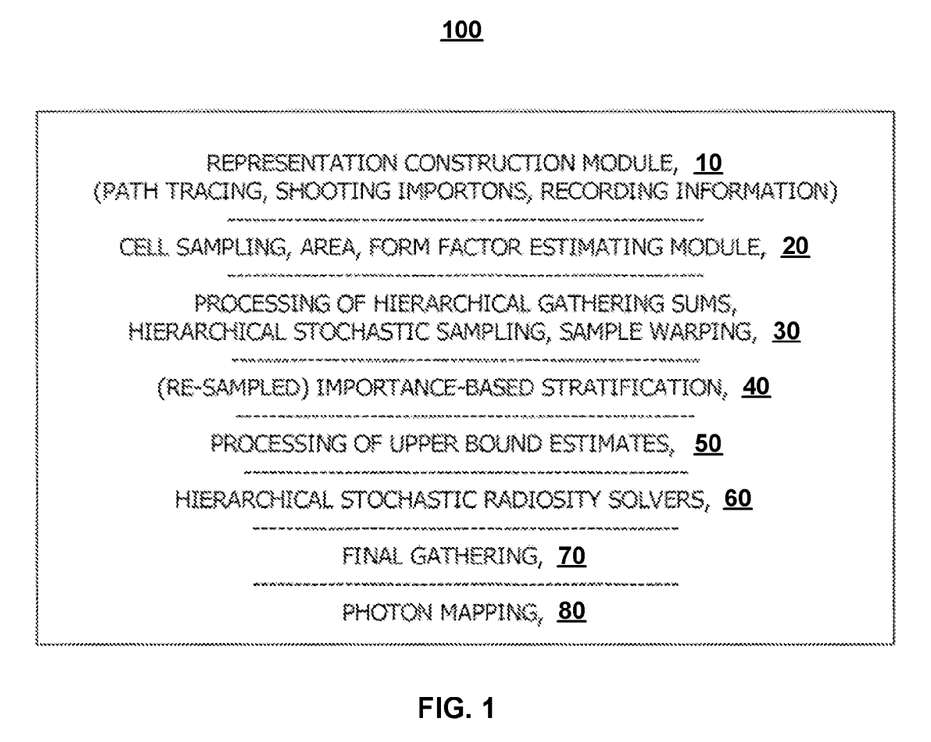
FIG. 1 is a schematic block diagram of processing modules according to one embodiment the present invention, implemented within a suitable digital processing system.

As discussed herein, known forms of integrated circuit or semiconductor elements such as ASICS can be implemented in such a manner, using the teachings of the present invention described herein, to carry out the methods of the present invention as shown, for example, in the attached drawings and discussed herein, and to implement modules 10, 20, 30, 40, 50, 60, 70, and 80 within a suitable processing system 100, as shown in FIG. 1. It should again be noted that the organization and number of modules in FIG. 1 is just one example, and the modules can be arranged differently or carry out different functions, whether singly or in combination, and still be within the spirit and scope of the present invention. Examples of suitable processing systems are set forth in FIGS. 5 and 6A-6B, discussed below.

The invention can be described as including aspects of constructing an image representation, using Monte-Carlo or quasi-Monte Carlo path tracing, shooting importons from a simulated camera into the scene: recording, for each bounce of the importons, information for a particle i, defined by 3D position, surface normal and reflectance factor; utilizing or performing cell sampling, area and/or form factor estimates; hierarchical gathering sums; hierarchical stochastic sampling; sample warping; importance-based and re-sampled importance based stratification; computing upper bound estimates; final gathering; and photon mapping.

Each of these aspects and elements will next be discussed in detail in the following pages, which are arranged into the following sections:
1. Introduction
2. Cell Sampling, Area and Form Factor Estimates
3. Hierarchical Gathering Sums
   3.1 Technique 1: Sample Warping
   3.2 Technique 2: Importance-Based Stratification
   3.3 Technique 3: Resampled Importance-Based Stratification
   3.4 Computing Upper Bound Estimates
4. Hierarchical Stochastic Radiosity Solvers
5. Final Gathering
6. Photon Mapping
7. Wavelet Direct Transfer Operator for Interactive Relighting
8. General Technique
9. Digital Processing Environment in Which Invention Can Be Implemented 1. Introduction The light transport in a scene can be expressed by the following equation:

$$L(x,\omega) = \int_M L(y,\omega_{y \to x}) f_r(x, \omega_{y \to x}, \omega) G(x,y,n_x,n_y) V(x,y) dA(y) + L^e(x,\omega) \tag{1}$$

where M is the set of scene surfaces, L is the outgoing radiance, $L^e$ the emitted radiance, $f_r$ the bidirectional reflectance distribution function (BRDF), V the intervisibility function between a pair of points, and G is the geometric throughput:

$$G(x, y, n_x, n_y) = \frac{T(n_x, y-x) T(n_y, x-y)}{\pi |x-y|^2} \tag{2}$$

$$G(x,y,n_x,n_y) = T(n_x,y-x) T(n_y,x-y)/\pi |x-y|^2 \tag{2}$$

T (u, v) being the cosine of the angle between u and v if they have the same orientation, zero otherwise.

The goal of light transport algorithms is to compute a set of measurements $I_j$ (typically corresponding to the values of each pixel in an image) defined as:

$$I_j = \int_{M \times \Omega} W_j(x,\omega) L(x,\omega) dA(x) \cos(\theta) d\omega \tag{3}$$

where $W_j$ is the response function of the j-th sensor, and $\theta$ is the angle between $\omega$ and the surface normal at x.

The light transport equation can also be rewritten in compact form as:

$$L = TL + L^e \tag{4}$$

where T is the linear functional operator defined by:

$$(TL)(x,\omega) = \int_M L(y,\omega_{y \to x}) f_r(x,\omega_{y \to x}, \omega) G(x,y,n_x,n_y) V(x,y) dA(y) \tag{5}$$

or:

$$(TL)(x,\omega) = \int_\Omega L(h(x,-\omega'), f_r(x,\omega',\omega) \cos(\theta') d\omega' \tag{6}$$

where the integral over the scene surfaces has been replaced by an integral over the sphere of directions $\Omega$, $\theta'$ is the angle between $\omega'$ and $n_x$, and h (x,$-\omega'$) is the first point visible from x in direction $-\omega'$.

Finite elements can be used to represent the radiance function in a finite series In form:

$$L(x, \omega) = \sum_j L_j b_j(x, \omega) \tag{7}$$

where $b_j$ (x, $\omega$) are a given set of basis functions and $L_j$ are scalar coefficients. Usually, such basis functions are constructed as the product of a set of positional basis functions and a directional one, where the positional basis functions are constant or linear over a set of patches.

With this representation, equation (4) becomes:

$$L_i = \left\langle T \sum_j L_j b_j, b_i \right\rangle + L_i^e \qquad (8)$$

$$= \left\langle \sum_j (Tb_j)L_j, b_i \right\rangle + L_i^e$$

which can be further simplified to:

$$L_i = \sum_j T_{i,j} L_j + L_i^e \qquad (9)$$

$$T_{ij} = \langle Tb_j, b_i \rangle$$

if the basis functions form an orthonormal system (i.e., $\langle b_i, b_j \rangle = \delta_{ij}$).

In the case of purely Lambertian reflection, the directional dependence on ω disappears, $b_j$ can be written as $b_j(x)$, and T can be defined as:

$$(TL)(x) = \rho(x) \int_M L(y) G(x,y,n_x,n_y) V(x,y) dA(y) \qquad (10)$$

where ρ(x) is the Lambertian reflection coefficient at x.

Classical radiosity techniques discretize radiosity B=πL and the transport operator over a set of N oriented polygonal patches $\{P_i: i=1, \ldots, N\}$ representing the scene surfaces, and attempt to solve the linear system:

$$B_i = \sum_{j=1}^{N} T_{i,j} B_j + B_i^e \qquad (11)$$

where $T_{ij}$ is now $\rho_i F_{ij}$ and $F_{ij}$ is the geometric form factor between the pair of patches (i,j):

$$F_{ij} = \int_{P_i} \int_{P_j} G(x,y,n_x,n_y) V(x,y) dA(x) dA(y) \qquad (12)$$

Again, in matrix form, this can be more compactly rewritten as:

$$B = TB + B^e. \qquad (13)$$

where T is now the "N×N radiosity matrix."

Solving the equation directly using dense linear system solvers would be infeasible even for relative small values of N, and hence, several fast iterative solvers have been developed which aimed at reducing the computational time and memory complexity to $\mathcal{O}(N \log N)$ or even $\mathcal{O}(N)$.

However, the main limitation of all such techniques is the remaining strong dependence on the input scene description, which needs to be entirely tessellated up front. For large production scenes, where even the sheer amount of polygons needed to faithfully represent subpixel curvature of visible high order and procedurally displaced surfaces only is often more than what can fit in physical memory, this has been proven impractical. Moreover, since light transport is non-local and the accuracy of the resulting solution for any point in space is dependent on the accuracy of the solution of all the other points, standard methods for view-dependent tessellation could no longer be used.

Described herein is a novel framework for radiosity and global illumination techniques based on a sparse implicit scene representation with the following properties:

(1) The obtained representation is independent of the geometric encoding and complexity of the input scene description.

(2) The density of the resulting finite elements is proportional to their contribution to the final image. That is to say, the geometric resolution of a given area of the obtained scene representation is proportional to its importance relative to the final image.

This is achieved by using a Monte Carlo or Quasi-Monte Carlo path tracing method to sample the adjoint importance distribution and shoot importons from the camera into the scene, recording, for each bounce, a particle i defined by the following information:

(1) three-dimensional position $p_i$
(2) surface normal $n_i$
(3) reflectance factor $\rho_i$ Now, if it is considered that the 5-dimensional space $R^3 \times S^2$, where $R^3$ represents the space of positions and $S^2$ is the unit sphere of directions, equipped with the Euclidean distance metric:

$$d((x,n_x),(y,n_y)) = \alpha|x-y| + |n_x - n_y|. \qquad (14)$$

the obtained sparse point cloud is implicitly defining a Voronoi diagram whose cells are given by:

$$V_{i\,|\,=\{}(x,n) \in R^3 \times S^2: d((x,n),(p_i,n_i)) < d((x,n),(p_j,n_j)) \forall j \neq i\}. \qquad (15)$$

This diagram can be intersected with the scene surfaces to obtain surface cells defined by:

$$V_i^M = \{(x,n) \in M: d((x,n),(p_i,n_i)) \leq d((x,n),(p_j,n_j)) \forall j \neq i\}. \qquad (16)$$

The free parameter α can be used to control the relative importance of normal versus positional discrepancy, and in our tests it is set to 1/diag $(\{p_i: i=1, \ldots, N\})$.

The surface patches defined implicitly by these cells can be used as the basis needed to apply equations (6), (8) and (10).

The following sections describe in detail a new hierarchical stochastic radiosity technique, a new photon mapping technique, and a new final gathering technique based on this novel framework.

2. Cell Sampling, Area and Form Factor Estimates

Central to any global illumination and radiosity technique operating on finite elements is the computation of integrals on surface patches. For example, radiosity requires the computation of form factors $F_{ij}$. In the developed framework, this amounts to computing integrals of the form:

$$I = \int hd\ \pi(V_i^M f(x,n_x) dA(s) \qquad (17)$$

where f is any function defined on and $V_i^M$, and π is the canonical 3d projection:

$$\pi: R^3 \times S^2 \to R^3$$

$$(x,n) \to x \qquad (18)$$

In order to compute such integrals, an approximation to $V_i^M$ is developed that allows easy sampling, namely the intersection of $V_i$ with a disc laying on the tangent plane at $x_i$. As the following construction shows, such disc is obtained taking the 3-d bounding sphere of the position component of the vertices of the Voronoi cell $V_i$ and intersecting it with the tangent plane.

For each point $p_i$, let $T_i$ denote the local-tangent plane to M:

$$T_i = \{x \in R^3: x \cdot n_i = p_i \cdot n_i\}. \qquad (19)$$

For each cell $V_i$, we then consider the 3d sphere $B_i(r_i)=B(p_i,r)$ centered in $p_i$ and passing through the furthest vertex of the projection $\pi_i(\pi(V_i))$.

The collection of such spheres form a covering of the convex hull of the points $p_i$. Moreover, for interior cells, $B_i(r_i)$ has the property of containing $\pi(V_i)$ (and hence $\pi(V_i^M)$ as well).

Now, if $D_i(r_i)$ is the disc $T_i \cap B_i(r_i)$, we consider the following locally flat, finite approximation to $V_i^M$:

$$V_i^T = \{x \in D_i(r_i) : (x,n_i) \in V_i\} \quad (20)$$

and approximate I with the formula:

$$I \approx \int_{V_i^T} f(x,n_i) dA(x) = \int_{D_i(r_i)} \chi_i(x) f(x,n_i) dA(x) \quad (21)$$

where $\chi_i$ is the characteristic function of $V_i^T$ (intuitively, $V_i^T$ is the intersection of the tangent plane $T_i$ with a bounded version of the original 5d Voronoi cell $V_i$).

In order to compute this integral, it is necessary to be able to evaluate $r_i$ and $\chi_i$. Although it would be theoretically possible to evaluate them exactly by computing the actual vertices of each cell $V_i$, we just build an approximation using any 5-dimensional nearest neighbor search structure, such as a kd-tree.

Let $nn_k(x,n)$ be the function returning the k-th nearest neighbor of $(x,n)$ among $\{(p_i,n_i): i=1,\ldots,N\}$ and let $\delta_i$ be the function:

$$\delta_i(x,n) = 1 \forall (x,n) : nn_1(x,n)=(p_i,n_i) \; 0 \; \forall (x,n): nn_1(x,n) \neq (p_i,n_i) \quad (22)$$

It can be easily proven that $\delta_i(x,n_i)=\chi_i(x) \forall x \in T_i$, and if we assume all Voronoi cells $V_i$ to have less than m vertices, we can bound $r_i$ with the 3d distance from $p_i$ to its m-th nearest neighbor:

$$r_i \leq R_i = |\pi(nn_m(p_i,n_i)) - p_i|. \quad (23)$$

Then, by generating a set $S_i$ of M random or quasi-random samples uniformly distributed over the disc $D_i(R_i)$ we can approximate the integral of equation (21) by the sum:

$$I \approx \frac{\pi R_i^2}{M} \sum_{s_i \in S_i} \delta_i(s_i, n_i) f(s_i, n_i) \quad (24)$$

For example, the area of each cell can be estimated by:

$$A_i = \int_{V_i^T} dA(x) \approx \frac{\pi R_i^2}{M} \sum_{s_i \in S_i} \delta_i(s_i, n_i). \quad (25)$$

The same principles can be used to compute form factors. In fact, while for two distant Voronoi cells, these can be estimated by the point-to-point approximation formula:

$$F_{ij} \approx G(p_i, p_j, n_i, n_j) V(p_i, p_j) \quad (26)$$

For neighboring cells, the error introduced by this approximation can become arbitrarily large due to possible singularities in the integrand, hence, a more accurate approximation is proposed. It is in fact sufficient to generate two sets of samples $S_i$ and $S_j$ for $V_i^T$ and $V_j^T$ respectively to compute the double integral:

$$F_{ij} \approx \frac{\pi^2 R_i^2 R_j^2}{M^2} \sum_{s_i \in S_i} \sum_{s_j \in S_j} \delta_i(s_i, n_i) \delta_j(s_j, n_j) G(s_i, s_j, n_i, n_j) V(p_i, p_j) \quad (27)$$

where the visibility term has been treated as a constant, and approximated by the mutual visibility of the cell centers.

The existence of a small bound m on the number of vertices of each cell $V_i^M$ is also a reasonable assumption. In fact, it can be proven that for any set of points on a 2-dimensional manifold, the average number of vertices of their Voronoi cells is 6. It has been found that 16 is sufficient in most of the cases.

3. Hierarchical Gathering Sums

Let us consider a doubly-indexed set of basis functions $b_i$ with $i=(i_0, i_1)$ defined as the product of the set of positional functions $\{Xi\}i=1 \ldots N$, and any set of M directional basis functions $\{d_k : \Omega \to R\}_{k=1 \ldots M}$:

$$b_i(x,\omega) = x_{i_n}(x) d_{i_n}(\omega) \quad (28)$$

According to equation (9), the equilibrium distribution of radiance can be approximated as the fixed point of the iterative system:

$$L_i^{(r)} = \sum_{j=(1,1)}^{(N,M)} T_{ij} L_j^{(r-1)} + L_i^c = T_i \cdot L^{(r-1)} + L_i^c \quad (29)$$

$$L_i^{(0)} = L_i^c$$

where $T_i$ is interpreted as the i-th row of the transport matrix $T_{ij}$:

$$T_{ij} = \langle T b_j, b_i \rangle \quad (30)$$

$$= \int_{V_{i_0}^T \times \Omega} \int_{V_{j_0}^T} T_{ij}(x, \omega, y) dA(y) dA(x) d\omega$$

with the "transport kernel" defined as:

$$T_{ij}(x,\omega,y) = b_i(x,\omega) b_j(y,\omega_{y \ldots x}) f_r(x, \omega_{y \ldots x} \omega) G(x,y,n_x,n_y) V(x,y). \quad (31)$$

Equation (29) can also be written in differential form as:

$$L_i^{(r)}(x, \omega) = \sum_{j=(1,1)}^{(N,M)} T_{ij}(x, \omega) L_j^{(r-1)} + L_i^c(x, \omega) \quad (32)$$

$$= T_i(x, \omega) \cdot L^{(r-1)} + L_i^c(x, \omega)$$

where $T_{ij}(x, \omega)$ is the "element to point" transport function:

$$T_{ij}(x,\omega) = [(Tb_j)(x,\omega)] b_i(x,\omega) \quad (33)$$

and $L_i^{(r)}$ is obtained integrating the "differential lighting element" $L_i^{(r)}(x,\omega)$ over the support of the i-th basis function:

$$L_i^{(r)} = \int_{V_{x_0^T} \times \Omega} L_i^{(r)}(x,\omega) dA(x) d\omega \quad (34)$$

Similarly, in the context of radiosity and a directionally independent set of basis functions $b_i = x_i$, one would need to solve sums of the form:

$$B_i^{(r)} = \sum_j^N T_{ij} B_j^{(r-1)} + B_i^c = T_i \cdot B^{(r-1)} + B_i^c \quad (35)$$

where the transport matrix becomes:

$$T_{ij} = \int_{V_i^T} \int_{V_j^T} T_{ij}(x,y) dA(y) dA(x) \quad (36)$$

and the transport kernel simplifies to:

$$T_{ij}(x,y) = b_i(x) b_j(y) \rho_i(x) G(x,y,n_x,n_y) V(x,y). \quad (37)$$

In both cases, the outer summation computes all the light reflected by a given finite element by gathering light arriving from all the other N×M elements. Straight evaluation of such sums would require $\mathcal{O}(N\,M)$ time complexity, which would make it infeasible to iteratively compute them for all the finite elements. Hence we propose three new hierarchical stochastic sampling algorithms which allow the evaluation of each sum in $\mathcal{O}(\log(N\,M))$ time.

3.1 Technique 1: Sample Warping

Let us consider the basis functions $b_i = \chi_{i_0} d_{i_1}$ defined as before, and $L_i$ an initial set of coefficients. Suppose also that for any function $d_k$ there is a principal direction $\omega_k$ such that $d_k$ has a maximum in $\omega_k$. It is desired to compute a transport iteration $L'_i = T_i \cdot L + L_i^e$.

Now, consider a bounding volume hierarchy over the product of the set of cells $V_i^T$ and the directions $\omega_k$. A node n in this hierarchy represents a cluster of finite elements, and it can be defined by a 3d bounding box $B_n$, a bounding cone $C_n^m$ for the set of normals contained inside it, and a total outgoing radiance value $L_n$, corresponding to the sum of the current radiance values of all the cells inside the node.

Given a node n and a basis function i, the total energy transfer from n to i can be expressed both in differential and integral form as:

$$L_{n \to i}(x, \omega) = T_{i,j \in n}(x, \omega) \cdot L_{j \in n} = \sum_{j \in n} T_{ij}(x, \omega) L_j \quad (38)$$

$$L_{n-1} = \int_{V_{j_0}^T \times \Omega} L_{n\ldots i}(x, \omega) dA(x) d\omega. \quad (39)$$

Now, suppose it's possible to quickly compute an upper-bound estimate $\hat{L}_{n \to i}$ for each node n, and each finite element i (there will be described below several techniques for estimating them). For a fixed i, the set of quantities defines a hierarchy of bounds on the energy outgoing from i due to each single node.

The following algorithm uses this hierarchy to perform importance sampling, and evaluate the sum $T_i \cdot L$ using the Monte Carlo or Quasi-Monte Carlo quadrature formula:

$$T_i \cdot L \approx \frac{1}{S} \sum_{k=1}^{S} \frac{T_{ij_k} L_{jk}}{P_{j_k}} \quad (40)$$

where $j_k$ is the k-th random or quasi-random sample, and $Pj_k$ is its discrete probability.

Figure 2:
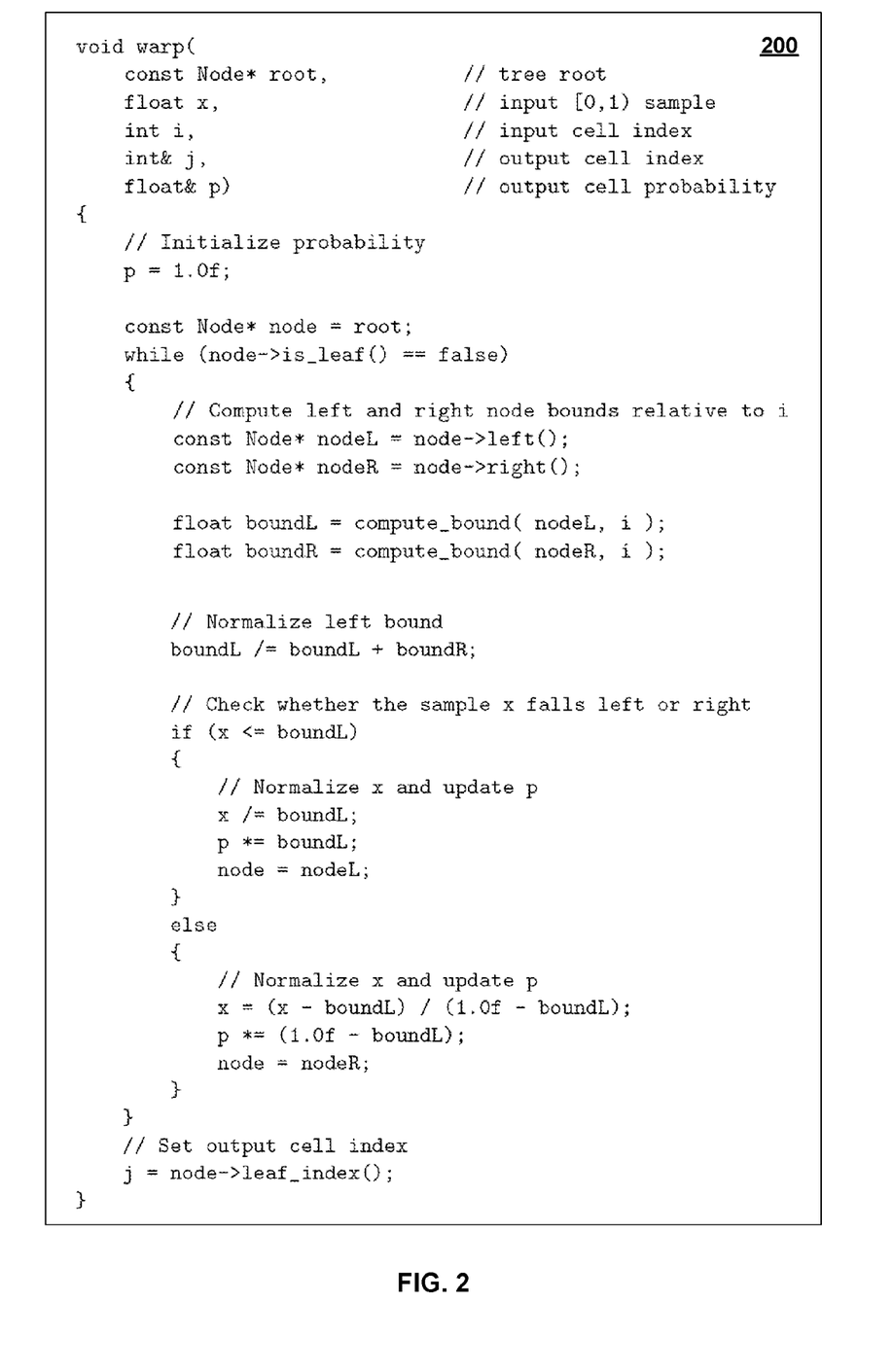
FIG. 2 is an exemplary code listing of a sample warping technique according to an aspect of the invention.

FIG. 2 shows an exemplary code listing 200 according to the presently described aspect of the invention. In order to select the samples $j_k$, we take a set of S uniformly distributed random or quasi-random samples in [0, 1) and redistribute them over the set of basis function indices using the warping functions shown in the code listing 200. In FIG. 2, the basis function indices have been treated as single integers instead of integer pairs, since they can be remapped using the following functions:

$$(\cdot)_0 : i \to \lfloor i/M \rfloor$$

$$(\cdot)_1 : i \to i \bmod M$$

Additionally, in order to compute $T_{ij_k}$ in (39), it's possible to use the integration technique developed in section 2 using a single sample estimator, and obtain:

$$T_i \cdot L \approx \frac{1}{S} \sum_{k=1}^{S} \frac{(\pi^2 R_i^2 R_{j_k}^2) T_{ij_k}(x_k, \omega_k, y_k) L_{j_k}}{P_{j_k} P_{\omega_k}} \quad (41)$$

where $x_k$ and $y_k$ are independent uniformly distributed samples inside the circles $D_i(R_i)$ and $D_{j_k}(R_{jk})$ respectively, and $\omega_k$ is a direction in $\Omega$ sampled according to some probability distribution function $P\omega_k$, ideally proportional to $d_{i_0}$.

Alternatively, it's also possible to evaluate $T_i \cdot L$ in its differential form at any given point $(x, \omega)$ as:

$$T_i(x, \omega) \cdot L \approx \frac{1}{S} \sum_{k=1}^{S} \frac{(\pi R_{j_k}^2) T_{ij_k}(x, \omega, y_k) L_{j_k}}{P_{j_k}} \quad (42)$$

3.2 Technique 2: Importance-Based Stratification

Similarly to the previous section, we evaluate the sum $T_i \cdot L = \Sigma T_{ij} L_j$ using the stochastic approximation formula (40), however, instead of relying on sample stratification in the [0, 1) interval before warping, we now propose a scheme to automatically split the sampling domain, i.e., the cell tree, into several strata containing one sample each, where each stratum is a node whose size is inversely proportional to its importance.

The technique is straightforward. Essentially, the root of the tree is inserted into a priority queue, ordered by the nodes' importance. Then, for each iteration in a loop the top of the tree is extracted. If the node is a leaf, it is inserted into a vector holding the output strata, otherwise it is split, and its children are reinserted into the queue. The loop stops when total number of nodes in the queue plus the number of leaves visited reaches the desired number of strata.

Figure 3:
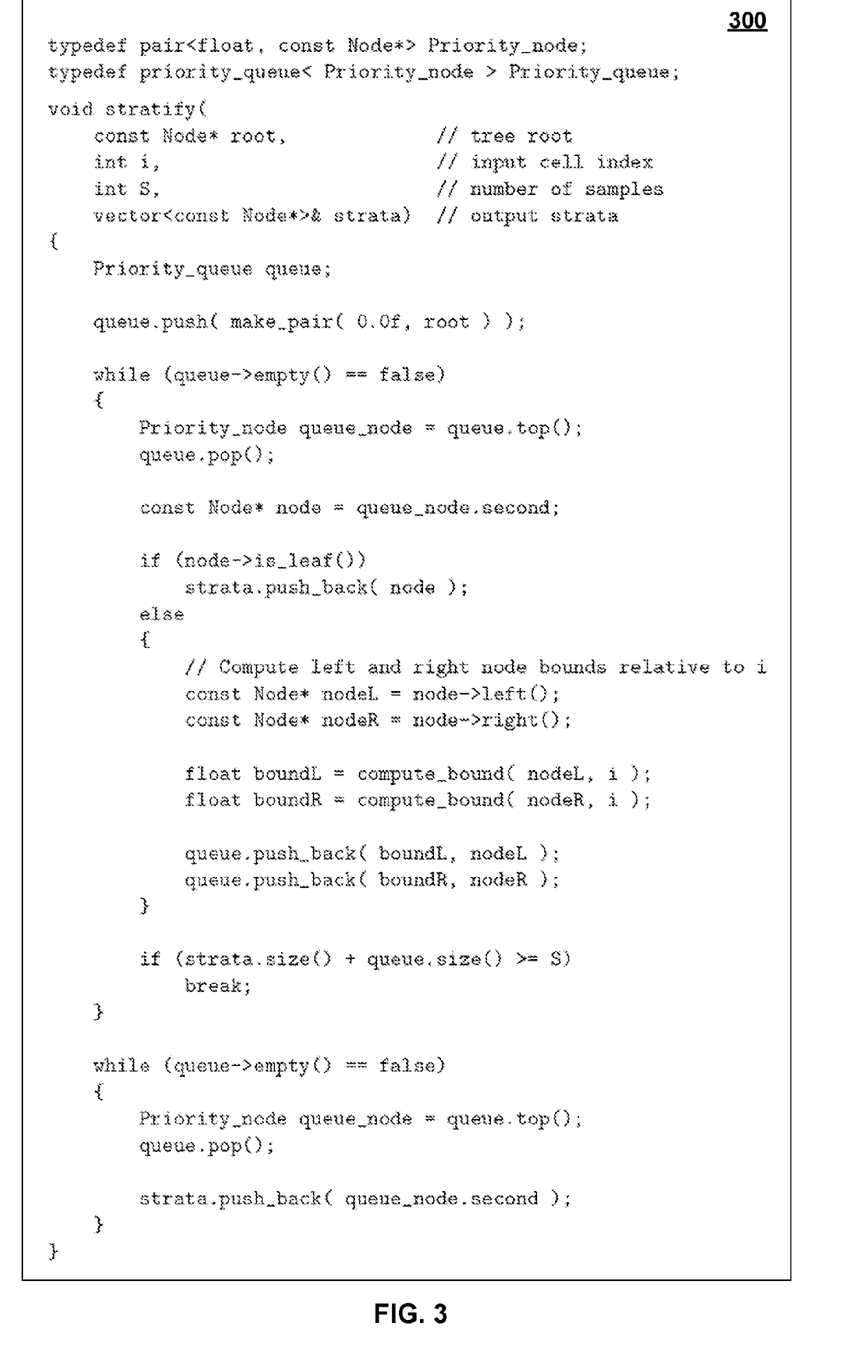
FIG. 3 is an exemplary code listing of an importance-based stratification technique according to a further aspect of the invention.

FIG. 3 shows an exemplary code listing 300 according to the presently described aspect of the invention. The output is a vector containing approximately S nodes forming a partitioning of the cell tree. It is then sufficient to generate one sample inside each node, either using a simple sample selection algorithm or using the sample warper of the previous section, to sample the entire cell hierarchy. In this case, if each sample $j_k$ from each stratum k is selected with a probability density of $Pj_k$ (with respect to the stratum), equation (40) becomes:

$$T_i \cdot L \approx \sum_{k=1}^{S} \frac{T_{ij_k} L_{j_k}}{P_{j_k}}. \quad (43)$$

3.3 Technique 3: Resampled Importance Based Stratification

Now, suppose our estimates $\hat{L}_{n \to i}$ are not very precise, or suppose that the transfers from the individual basis functions inside a node n have high variance. Then, taking a low number of samples S might still not capture all the important details needed for approximating the sum (39) accurately. Moreover, typically the dominant cost in evaluating the contribution of each $T_{ij} L_j$ is the cost of evaluating the intervisibility function V. Hence, we propose the following resampling strategy.

For a given pair (i, j), we define the "simplified transport functional" $\tilde{T}_{ij}$ as:

$$\tilde{T}_{ij}(x, \omega) = \int_{V_{j_0}^T} \tilde{T}_{ij}(x, \omega, y) \, dA(y) \quad (44)$$

where:

$$\tilde{T}_{ij}(x,\omega,y) = b_i(x,\omega) b_j(y, \omega_{y \to x}) f_r(x, \omega_{y \to r}, \omega) G(x,y,n_x,n_y) \quad (45)$$

Now, we can use Technique 2 to select R×S strata for some given integer R, Technique 1 to select one sample $j_k$ for each stratum k with probability $pj_k$, and then resample S samples $\{j_k(s)\}_{s=1 \ldots s}$ out of them using the probability density:

$$\tilde{p}_{j_k} = \frac{1}{c} \cdot \frac{\tilde{T}_{ij_k} L_{ij_k}}{P_{j_k}} \tag{46}$$

$$c = \sum_{k=1}^{R \times S} \frac{\tilde{T}_{ij_k} L_{ij_k}}{P_{j_k}}.$$

Finally, the sum of equation (4) can now be estimated by:

$$T_i \cdot L \approx \frac{c}{S} \sum_{s=1}^{S} V_{ij_k(s)} \tag{47}$$

$V_{ij}$ being the visibility between the cells $V_{i_0}^{-T}$ and $V_{j-1}^{-T}$, approximated as before by the visibility of their centers $V(P_{io}, P_{jo})$.

3.4 Computing Upper Bound Estimates

In the previous subsections we have assumed it was possible to quickly computer upper bound estimates $\hat{L}_{n \rightarrow i}$ for equations (38) and (39). This is possible by decomposing their value into several components:

$$\hat{L}_{n \rightarrow i} = L_n \int_{V_{i_0}^T \times \Omega} \hat{F}_{n \rightarrow i}(x, \omega) \hat{G}_n(x) \hat{V}_n(x) dA(x) d\omega \tag{48}$$

where $\hat{F}_{n,i}$ is an upper-bound estimate on the brdf term times the directional basis functions:

$$\hat{F}_{n \rightarrow i}(x, \omega) = \max_{y \in B_n, j \in n} d_{i_1}(\omega) d_{j_1}(\omega_{y \rightarrow x}) f_r(x, \omega_{y \rightarrow x}, \omega) \tag{49}$$

bounds the geometric factor from n to any other point:

$$\hat{G}_n(x) = \max_{y \in B_n, n_y \in C_n^n} G(x, y, n_x, n_y) \tag{50}$$

$\hat{V}_n$ bounds the visibility term:

$$\hat{V}_n(x) = \max_{y \in B_n} V(x, y) \tag{51}$$

Now, $\hat{V}_n(x)$ is a Boolean function assuming the values 0 and 1 only. Bounding visibility from a cluster to a point can be done using conservative visibility hierarchies, however, it's also possible to set $\hat{V}_n(x)=1$ $\forall x, n$ without loss of generality.

On the contrary, the geometric term $G_n(x)$ and the reflection term $\hat{F}_{n \rightarrow 1}$ can be bound by further splitting them into subcomponents:

$$\hat{G}_n(x) \le \frac{\max_{y \in B_n} T(n_x, y - x) \max_{y \in B_n, n_y \in C_n^n} T(n_y, y - x)}{\min_{y \in B_n} |x - y|^2} \tag{52}$$

and $$\hat{F}_{n \rightarrow i}(x, \omega) \le d_{i_1}(\omega) \max_{y \in B_n, j \in n} d_{j_1}(\omega_{y \rightarrow x}) \max_{y \in B_n} f_r(x, \omega_{y \rightarrow x}, \omega) \tag{53}$$

Now, the distance between a point and a bounding box, and the bounds on T between a point and a box with an associated cone of normals can all be computed analytically. For the bounds on the basis functions $d_k$ and the bidirectional reflectance distribution function (BRDF) term, we can instead use the formulas:

$$\max_{y \in B_n, j \in n} d_{j_1}(\omega_{y \rightarrow x}) \le \max_{\omega' \in C(x, B_n), j \in n} d_{j_1}(-\omega') \tag{54}$$

and $$\max_{y \in B_n} f_r(x, \omega_{y \rightarrow x}, \omega) \le \max_{\omega' \in C(x, B_n)} f_r(x, -\omega', \omega) \tag{55}$$

where $C(x, B_n)$ is the bounding cone of $B(n)$ seen from the point x. It is important to note that even though equation (49) requires the computation of a maximum over all of the basis functions in n, as a matter of fact the maximum is only restricted to the directional components, which are always less than or equal to M. If close form expressions for such bounds are not available, these can be approximated by Monte Carlo or Quasi-Monte Carlo sampling a finite set of directions $\{\omega'_s\}s=1 \ldots, S$ in $C(x, B_n)$ and taking the maximum over these.

Finally, the outer integral of equation (48) can be estimated using the cell sampling techniques developed in section 2.

4. Hierarchical Stochastic Radiosity Solvers

Radiosity can be seen as the fixed point of the Jacobi iteration:

$$B_i^{(r)} = B_i^{(r-1)} + \Delta B_j^{(r)}, \tag{56}$$

$$\Delta B_i^{(r)} = \rho i \sum_j F_{ij} \Delta B_j^{(r-1)},$$

$$B_i^{(0)} = \Delta B_i^{(0)} = B_i^e$$

which can be performed by the following straightforward algorithm:
   step 0
      ΔB:=B'
      B:=B'
   step 1
      for each i in $\{1, \ldots N\}$: $\Delta B_i' := \rho_i \Sigma_{j=1}^N F_{ij} \Delta B_j$
   step 2
      for each i in $\{1, \ldots N\}$: $B_i := B_i \Delta B_i'$. $\Delta B_i := \Delta B_i'$
   step 3
   if max, $(\Delta B_i) > e$ then goto step 1

In a naïve implementation, each evaluation of $\Delta B_i'$ would require evaluating and summing the contribution of all the N terms $F_{ij} \Delta B_j$. Since this would result in $\mathcal{O}(N^2)$ complexity for each iteration of step 2, this algorithm would quickly become unusable even for moderate cell counts. However, using the new sampling techniques described so far, it is possible to compute each term $\Delta B_i'$ in $\mathcal{O}(\log N)$ time, and a full solution in $\mathcal{O}(N \log N)$ time.

The same techniques can be applied to any other radiosity solver requiring the performance of the gathering of sums of this kind, leading to a whole new family of hierarchical stochastic radiosity solvers.

5. Final Gathering

In the previous sections we proposed several new hierarchical sampling schemes for the evaluation of the coefficient $T_1 \cdot L$, giving the projection of reflected lighting on the i-th basis function. For high frequency lighting or sharp glossy reflections, the resolution of the basis functions might be insufficient for direct visualization. However, it's easy to extend all the previously developed techniques to be used in the context of a "final gathering" phase, where the reflected lighting solution is recomputed for each shading point inside a pixel, or interpolated from a set of such shading points.

Let x be the shaded surface point and $-\omega$ the incoming viewing direction. We are interested in approximating $L(x, \omega)$.

In order to accomplish this, it is sufficient to define a new basis function:

$$b_\delta = \delta_x \delta_\omega \quad (57)$$

where $\delta_x$ and $\delta$ denote the Dirac delta at x and $\omega$, respectively, and evaluate the derived quantity $T_\delta(x, \omega) \cdot L$ using any of the presently described techniques.

For example, if Technique 1 is used to select S basis functions $\{j_k\}_{k=1,\ldots,s}$, formula (42) becomes:

$$T_\delta(x,\omega) \cdot L \approx \frac{1}{S} \sum_{k=1}^{S} \frac{(\pi R_{j_k}^2) T_{\delta_{j_k}}(x, \omega, y_k) L_{j_k}}{P_{j_k}} \quad (58)$$

Finally, $L(x, \omega)$ is given by:

$$L(x,\omega) = T_\delta(x,\omega) \cdot L + L'(x,\omega). \quad (59)$$

6. Photon Mapping

The new finite element basis functions can also be used for a new photon mapping technique. Basically, instead of trying to compute outgoing radiance as the fixed point of an iterative system, one can shoot R photon trajectories from the light sources using any regular photon shooting algorithm based on Monte Carlo or Quasi Monte Carlo sampling, and record, for any surface hit, the outgoing reflected radiance due to the incoming photon projected on all the affected basis functions.

In practice, the technique starts allocating an array of coefficients $L_{(i,j)}=0$ for any $(i,j)=(1,1), (N,M)$.

Then, during photon shooting, if a photon carrying an amount of energy $\Delta\Phi$ hits the surface point $(x,n_x)$, with incoming direction $\omega$, it is sufficient to find the Voronoi cell i containing the surface hit (using a nearest neighbor query), and update all the coefficients $L_{(i,j)}$ for any $j=1,\ldots, M$ by the amount:

$$\Delta L_{(i,j)} = \Delta\Phi \int_\Omega d_j(\omega') f_r(x, \omega, \omega') d\omega' \quad (60)$$

where the integral can be estimated by any regular Monte Carlo or Quasi Monte Carlo approximation.

The resulting coefficients can then be used to provide estimates of outgoing reflected radiance at any surface point $(x, n_x)$ and in any direction $\omega$ using the modified density estimation formula:

$$L(x, \omega) \approx \frac{1}{A} \sum_{s=1}^{S} \sum_{j=1}^{M} L_{(i_s,j)} d_j(\omega) \quad (61)$$

where is identifies the s-th Voronoi cell closes to $(x, n_x)$ and $A=\sum_{s=1}^{S} -Ai_s$.

Alternatively, it's possible to use the coefficients $L_{(i,j)}$ as inputs to a final gather pass using Techniques 1, 2, and 3 to computer accurate per-pixel lighting, possibly in conjunction with any image-based or spatial interpolation strategy.

7. Wavelet Direct Transfer Operator for Interactive Relighting

This section presents a framework for computing interactive relighting with global illumination. The key components of the algorithm are the use of a set of meshless wavelet basis functions to represent radiance transfer in a scene and the pre-computation of the full direct transfer operator (DTO) in this space. The DTO is then used during the relighting stage to approximate the effect of the global transfer operator (GTO) at interactive rates.

There is now provided an overview of this technique. Using the notation developed above, the light transport equation can be written using meshless finite elements as:

$$L = TL' + T^2L' + T^3L' + \quad (62)$$

where T is the N×N finite element transport matrix:

$$T_{ij} = \langle Tb_j, b_i \rangle \quad (63)$$

Basically, the role of T is to compute the direct lighting due to a given initial light source distribution, and hence it's also called the direct transfer operator, while the equation above states that the global transfer operator can be obtained as the sum of all its powers:

$$G = \sum_{i=1}^{\infty} T^i \quad (64)$$

where the i-th term represents the i-th light bounce.

This means that by knowing T, the solution to the rendering equation can be readily computed for any initial emission vector $L^e$, i.e., for any set of light emitters. The main problems are the $\mathcal{O}(N^2)$ computational and memory requirements which would be needed to compute and store each entry of T explicitly.

Here we show how to compute and compress a sparse approximation to T efficiently, and how to computer the product of this approximation with an arbitrary emission vector.

The key insight is that each row $T_i$ represents the direct lighting which would arrive on the i-th finite element if all the other elements had an emission coefficient of 1. Hence, it is possible to compute the entire row $T_i$ using a modified version of Techniques 1 and 2, described above.

Recall that the purpose of these algorithms was to sample a few representative terms of the product $T_i \cdot L$ using a spatial hierarchy on the set of finite elements. If we consider a hypothetical lighting vector $L = (1, \ldots, 1)$, it is possible to use the same techniques to sample a few representative terms of the entire row $T_i$. In particular, Technique 2 can be used to partition the entire set of finite elements into S strata. By using Technique 1, we can then sample a single finite element $j_k$ with probability $P_{j_k}$ from each stratum k, such that:

$$T_i \cdot (1, \ldots, 1) \approx \sum_{k=1}^{S} \frac{T_{ij_k}}{p_{j_k}}. \quad (65)$$

Now, we will assume that the lighting due to all the finite elements in each stratum k is constantly $$\frac{T_{ij_k}}{p_{j_k} n_k},$$

where, $n_k$ is the number of finite elements contained in the stratum. Moreover, we will assume that the indices of all the finite elements contained in each stratum are contiguous and form a continuous range (which is always achievable by numbering the finite elements according to their order of appearance in a depth-first sorting of the finite element hierarchy). With these assumptions, the row $T_i$ will be approximated as a piece-wise constant vector. Now, the wavelet expansion of $T_i$ will be mostly sparse, and hence it will be possible to compute each row $T_i$ sequentially, wavelet encode it, apply standard non-linear compression and storing the compressed coefficients, $W T_i$. By keeping a limited number S of coefficients the memory requirements for storing T will be proportional to $\mathcal{O}(N \times S)$. Now, this wavelet expansion of T can also be used to quickly approximate products of the kind TL for any lighting vector L: it will be sufficient to compute the wavelet expansion WL and to perform the N dot products:

$$(TL)_i \approx WT_i \cdot WL. \tag{66}$$

If WL is compressed keeping only the S most significant coefficients, the above products can be done in $\mathcal{O}(N \times S)$ time.

Finally, this can be used to efficiently evaluate equation (1): it is in fact sufficient to first evaluate $TL^e$, and then use the recursion formula:

$$T^i L' = T(T^{i-1} L'). \tag{67}$$

The recursion can be either terminated at a fixed bounce n or when the magnitude of $T^i L^e$ becomes negligible.

8. General Technique

Figure 4:
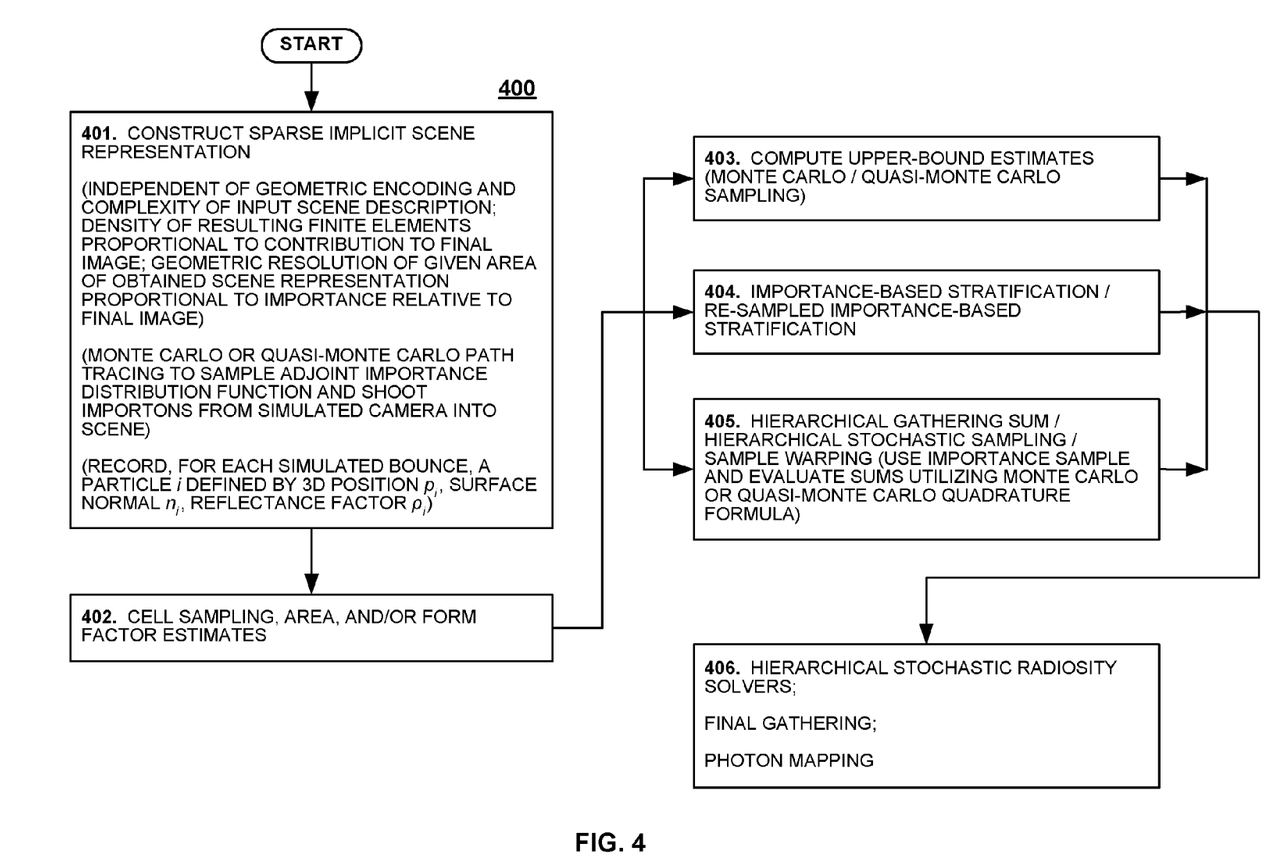
FIG. 4 is a flowchart of a general technique in accordance with various described aspects of the invention.

FIG. 4 shows a flowchart of a general technique 400 according to the above described aspects of the invention.

Box 401: Construct sparse implicit scene representation.

The sparse implicit scene representation is constructed to be independent of geometric encoding and complexity of input scene description. The density of resulting finite elements is proportional to their contribution to the final image. The geometric resolution of a given area of obtained scene representation is proportional to its importance relative to final image.

Monte Carlo or Quasi-Monte Carlo path tracing is used to sample adjoint importance distribution function and shoot importons from a simulated camera into the scene.

For each simulated bounce, there is recorded a particle i defined by 3d position $p_i$, surface normal $n_i$, reflectance factor $\rho_i$.

After Box 401, the technique 400 may proceed by combining one or more of the various elements set forth in Boxes 402-406:

Box 402: There is performed at least one of cell sampling, area, and form factor estimates.

Box 403: Upper-bound estimates are computed using either Monte Carlo or Quasi-Monte Carlo sampling.

Box 404: There is performed at least one of (1) importance-based stratification, or (2) re-sampled importance-based stratification.

Box 405: There is performed at least one of (1) hierarchical gathering sum, (2) hierarchical stochastic sampling, or (3) sample warping, using an importance sample and evaluating sums utilizing either a Monte Carlo or Quasi-Monte Carlo quadrature formula.

Box 406: Hierarchical stochastic radiosity solvers are then utilized: a final gathering is performed; and a photon mapping is performed.

As shown in FIG. 4, in performing the described technique 400, one or more of Boxes 403, 404, and 405 may be performed between Boxes 402 and 406. The timing of the performance of Boxes 403, 404, and 405 may be varied, in order to optimize computing resources, or to achieve some other desired result.

The flowchart of FIG. 4 is merely one example of process aspects in accordance with the invention, and it should be noted that the organization, order and number of process aspects can be varied; and that the process aspects can be arranged or ordered differently, and include different functions, whether singly or in combination, while still being within the spirit and scope of the present invention.

9. Digital Processing Environment in Which Invention Can Be Implemented

Systems, apparatuses, computer program products and methods in accordance with the invention are suitable for implementation or execution in a computer graphics system for rendering images for storage or for display on a display element, the computer graphics system comprising a computer, the displaying comprising the display of images on the display element, and wherein the rendering of an image comprises utilizing the computer and/or other elements of the computer graphics system to generate pixel values corresponding to pixels in an image representation.

Systems, apparatuses, computer program products or methods in accordance with the present invention are suitable for implementation or execution in, or in conjunction with, a wide range of commercially available computer graphics systems, including (but not limited to), for example, computer graphics products and systems commercially available from MENTAL IMAGES GmbH of Berlin, Germany. (See, for example, the MENTAL RAY product from MENTAL IMAGES GmbH.) The invention is also suitable for implementation or execution in, or in conjunction with, a wide range of other commercially available computer graphics systems, products, environments, hardware and software that provide rendering functionality. Given the description herein, and the attached drawing figures, one of ordinary skill in the relevant art will understand how the present invention may be so implemented or executed in, or in conjunction with, such commercially available computer graphics systems, products, apparatus or methods.

Figure 5:
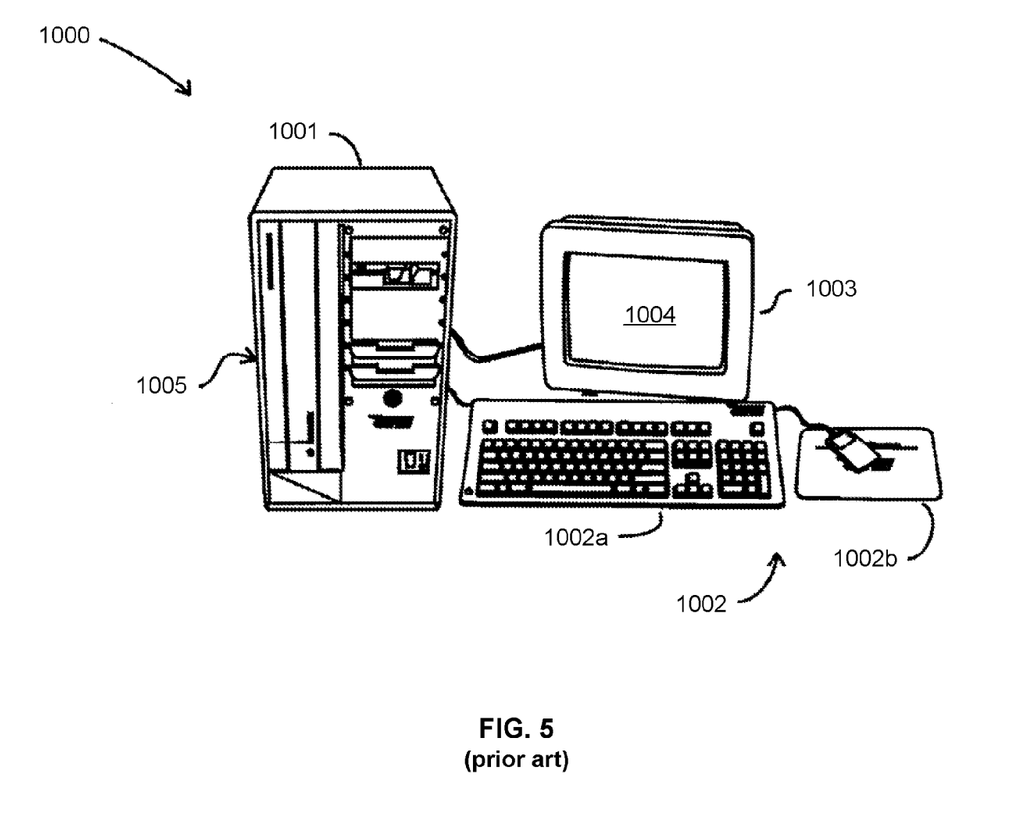
FIGS. 5 and 6A-6B are schematic block diagrams of conventional digital processing systems suitable for implementing and practicing described aspects of the invention.
Figure 6A:
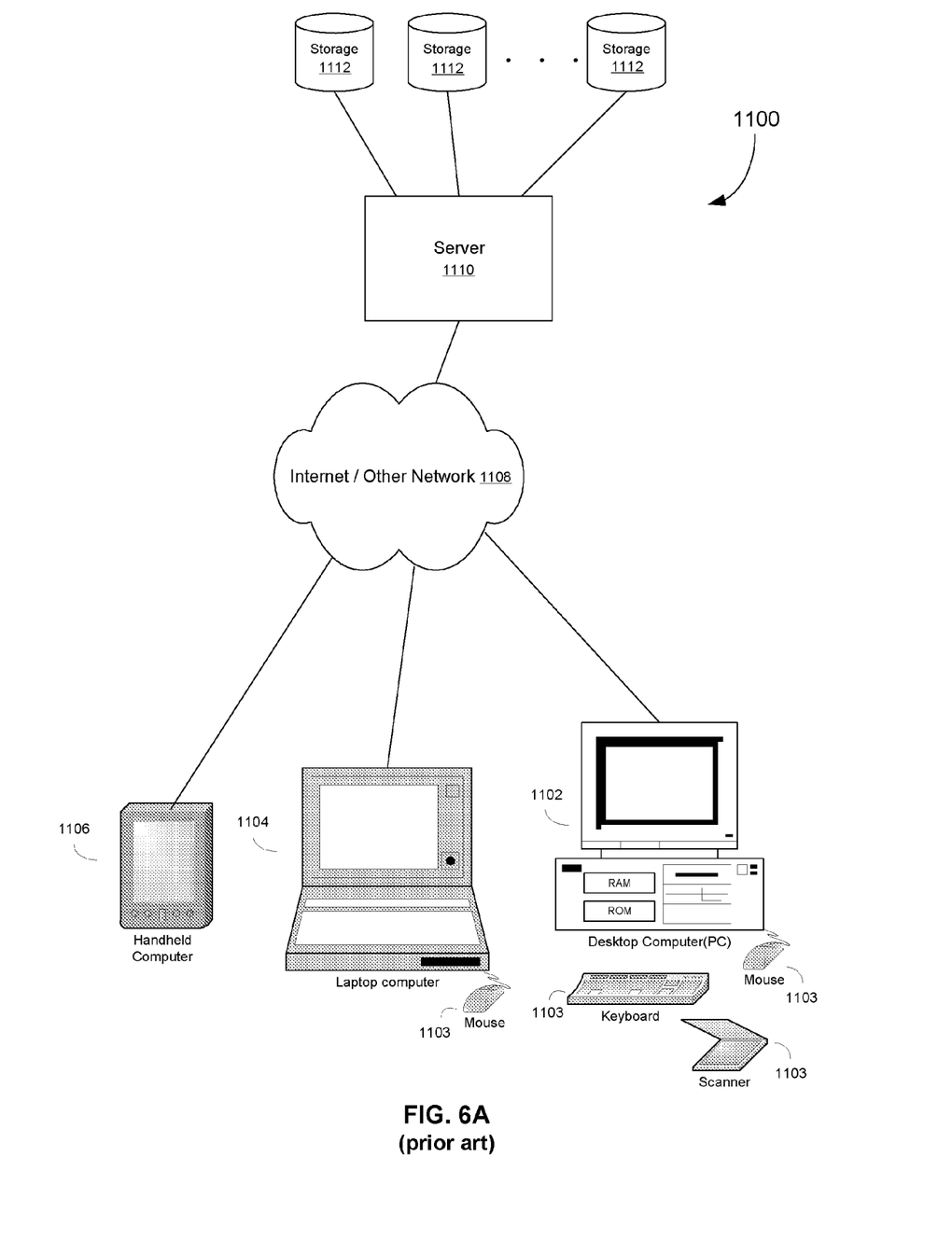
Figure 6B:
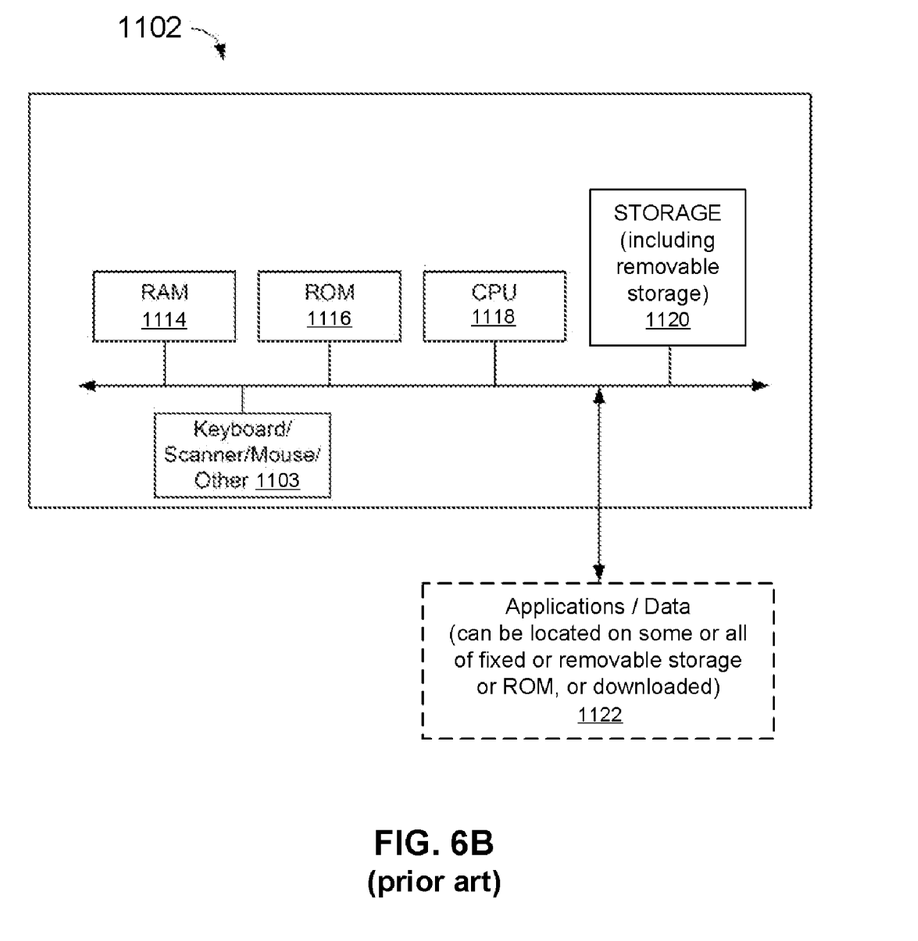

The following is a discussion, to be read in connection with FIGS. 5 and 6A-6B, of typical, relatively conventional digital processing structures and environments in which the above-described invention may be implemented and practiced.

It will be understood by those skilled in the art that the present invention, as described above, provides methods, systems, devices and computer program products that enable the creation of images and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The previous detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 5 attached hereto depicts an illustrative computer system 1000 that can carry out such computer graphics processes. With reference to FIG. 5, the computer system 1000 in one embodiment includes a processor module 1001 and operator interface elements comprising operator input components such as a keyboard 1002A and/or a mouse 1002B (or digitizing tablet or other analogous element(s), generally identified as operator input element(s) 1002) and an operator output element such as a video display device 1003. The illustrative computer system 1000 can be of a conventional stored-program computer architecture. The processor module 1001 can include, for example, one or more processor, memory and mass storage devices, such as disk and/or tape storage elements (not separately shown), which perform processing and storage operations in connection with digital data provided thereto. The operator input element(s) 1002 can be provided to permit an operator to input information for processing. The video display device 1003 can be provided to display output information generated by the processor module 1001 on a screen 1004 to the operator, including data that the operator may input for processing, information that the operator may input to control processing, as well as information generated during processing. The processor module 1001 can generate information for display by the video display device 1003 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and/or stored on a computer readable medium, whether that medium is fixed or removable, permanent or erasable, or otherwise. As noted, for example, in block 1122 of the schematic block diagram of FIG. 6B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 1000 is shown as comprising particular components, such as the keyboard 1002a and mouse 1002b for receiving input information from an operator, and a video display device 1003 for displaying output information to the operator, it will be appreciated that the computer system 1000 may include a variety of components in addition to or instead of those depicted in FIG. 5.

In addition, the processor module 1001 can include one or more network ports, generally identified by reference numeral 1005, which are connected to communication links which connect the computer system 1000 in a computer network. The network ports enable the computer system 1000 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system 1000 shown in the drawings, methods, devices or software products in accordance with the present invention can operate on any of a wide range of conventional computing devices and systems, such as those depicted by way of example in FIGS. 6A and 6B (e.g., network system 1100), whether standalone, networked, portable or fixed, including conventional PCs 1102, laptops 1104, handheld or mobile computers 1106, or across the Internet or other networks 1108, which may in turn include servers 1110 and storage 1112.

In line with conventional computer software and hardware practice, a software application configured in accordance with the invention can operate within, e.g., a PC 1102 like that shown in FIGS. 6A-6B, in which program instructions can be read from ROM or CD-ROM 1116 (FIG. 14B), magnetic disk or other storage 1120 and loaded into RAM 1114 for execution by CPU 1118. Data can be input into the system via any known device or means, including a conventional keyboard, scanner, mouse, digitizing tablet, or other elements 1103. As shown in FIG. 6B, the depicted storage 1120 includes removable storage. As further shown in FIG. 6B, applications and data 1122 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown in FIGS. 1-4, discussed above.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts are not necessarily part of the present invention, and their selection can be left to the implementer.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for generating a representation of an image, the method being executable in a computer graphics system comprising a computer operable to generate an image based on an image representation, for storage or for display on a display element, and wherein the generating of an image comprises generating, in the computer, pixel values corresponding to pixels in the image representation, the method comprising:

constructing, in the computer, a sparse implicit scene representation based at least in part on an input scene description, the sparse implicit scene representation having associated therewith a set of finite elements, wherein the representation is independent of geometric encoding and complexity of the input scene description, and the density of the finite elements is proportional to their contributions to the image to be generated, such that the geometric resolution of a given area of the scene representation is proportional to its importance relative to the image to be generated, wherein the constructing comprises executing, in the computer, a Monte Carlo or quasi-Monte Carlo path tracing method to sample an adjoint importance distribution function and to shoot importons from a simulated camera into the scene, and recording, in the computer, for each simulated bounce, a particle i defined by selected information, the selected information comprising:

3D position $p_i$, surface normal $n_i$, and reflectance factor $\rho_i$;

further comprising applying, in the computer, any of cell sampling, area and form factor estimates; and utilizing, in the computer, hierarchical stochastic sampling and sample warping in which importance samples are redistributed over a set of basis function indices using at least one warping function.

2. The method of claim 1 further comprising utilizing, in the computer, importance sampling and evaluating, in the computer, resulting sums utilizing a Monte Carlo or quasi-Monte Carlo quadrature formula.

3. The method of claim 1 further comprising utilizing, in the computer, importance-based stratification.

4. The method of claim 3 wherein utilizing importance-based stratification comprises utilizing, in the computer, re-sampled importance-based stratification.

5. The method of claim 4 further comprising computing, in the computer, upper bound estimates.

6. The method of claim 5 wherein the computing comprises utilizing, in the computer, Monte Carlo or quasi-Monte Carlo sampling.

7. The method of claim 6 further comprising utilizing, in the computer, hierarchical stochastic radiosity solvers.

8. The method of claim 7 further comprising performing, in the computer, a final gathering operation.

9. The method of claim 8 further comprising utilizing, in the computer, photon mapping.

10. A subsystem for generating a representation of an image, the subsystem being operable in a computer graphics system comprising a computer operable to generate an image based on an image representation, for storage or for display on a display element, and wherein the generating of an image comprises generating, in the computer, pixel values corresponding to pixels in the image representation, the subsystem comprising:

means for constructing, in the computer, a sparse implicit scene representation based at least in part on an input scene description, the sparse implicit scene representation having associated therewith a set of finite elements, wherein the representation is independent of geometric encoding and complexity of the input scene description, and the density of the finite elements is proportional to their contributions to the image to be generated, such that the geometric resolution of a given area of the scene representation is proportional to its importance relative to the image to be generated, wherein the means for constructing comprises:

means for executing, in the computer, a Monte Carlo or quasi-Monte Carlo path tracing method to sample an adjoint importance distribution function and to shoot importons from a simulated camera into the scene, and means for recording, in the computer, for each simulated bounce, a particle i defined by selected information, the selected information comprising:

3D position $p_i$, surface normal $n_i$, and reflectance factor $\rho_i$;

and further comprising means for applying, in the computer, any of cell sampling, area and form factor estimates; and means for utilizing, in the computer, hierarchical stochastic sampling and sample warping in which importance samples are redistributed over a set of basis function indices using at least one warping function.

11. The subsystem of claim 10 further comprising means for utilizing, in the computer, importance sampling and means for evaluating, in the computer, resulting sums utilizing a Monte Carlo or quasi-Monte Carlo quadrature formula.

12. The subsystem of claim 10 further comprising means for utilizing, in the computer, importance-based stratification.

13. The subsystem of claim 12 wherein the means for utilizing importance-based stratification comprises means for utilizing, in the computer, re-sampled importance-based stratification.

14. The subsystem of claim 13 further comprising means for computing, in the computer, upper bound estimates.

15. The subsystem of claim 14 wherein the means for computing comprises means for utilizing, in the computer, Monte Carlo or quasi-Monte Carlo sampling.

16. The subsystem of claim 15 further comprising means for utilizing, in the computer, hierarchical stochastic radiosity solvers.

17. The subsystem of claim 16 further comprising means for performing, in the computer, a final gathering operation.

18. The subsystem of claim 17 further comprising means for utilizing, in the computer, photon mapping.

19. A computer program product comprising computer program instructions stored on a non-transitory computer-readable medium, the computer program instructions being operable within a computer graphics system for generating images for display on a human-perceptible display element, the displaying comprising the display of image representations on the display element, wherein the display element is operable to generate a human-perceptible display of a scene in accordance with pixel values generated by the computer graphics system, the computer program instructions comprising:

first computer-readable instructions stored on the non-transitory computer-readable medium and executable within the computer graphics system for constructing a sparse implicit scene representation, wherein the representation is independent of geometric encoding and complexity of the input scene description, and the density of the resulting finite elements is proportional to their contribution to the image to be generated, such that the geometric resolution of a given area of the obtained scene representation is proportional to its importance relative to the image to be generated, wherein the first computer-readable instructions comprise second computer-readable instructions executable within the computer graphics system to enable the computer graphics system to execute Monte Carlo or quasi-Monte Carlo path tracing to sample an adjoint importance distribution function and to shoot importons from a simulated camera into the scene, and for recording, for each simulated bounce, a particle i defined by selected information, the selected information comprising:

3D position $p_i$, surface normal $n_i$, and reflectance factor $\rho_i$; and wherein the second computer-readable instructions comprise third computer-readable instructions executable within the computer graphics system for applying, in the computer, any of cell sampling, area and form factor estimates, and for utilizing, in the computer, hierarchical stochastic sampling and sample warping in which importance samples are redistributed over a set of basis function indices using at least one warping function.

* * * * *